United States Patent
Takayama et al.

(10) Patent No.: US 8,083,869 B2
(45) Date of Patent: *Dec. 27, 2011

(54) FERROUS SEAL SLIDING PARTS AND PRODUCING METHOD THEREOF

(75) Inventors: Takemori Takayama, Hirakata (JP); Chikara Nakao, Hirakata (JP)

(73) Assignee: Komatsu Ltd., Tokyo (JP)

( * ) Notice: Subject to any disclaimer, the term of this patent is extended or adjusted under 35 U.S.C. 154(b) by 269 days.

This patent is subject to a terminal disclaimer.

(21) Appl. No.: 11/065,105

(22) Filed: Feb. 25, 2005

(65) Prior Publication Data
US 2005/0189045 A1 Sep. 1, 2005

(30) Foreign Application Priority Data

Mar. 1, 2004 (JP) ................... 2004-056416
Feb. 10, 2005 (JP) ................... 2005-034801

(51) Int. Cl.
*C21D 5/00* (2006.01)

(52) U.S. Cl. ....................... 148/321; 148/612

(58) Field of Classification Search ............. 148/612, 148/321
See application file for complete search history.

(56) References Cited

U.S. PATENT DOCUMENTS

| | | | | |
|---|---|---|---|---|
| 5,082,433 A | * | 1/1992 | Leithner | 419/11 |
| 5,246,510 A | * | 9/1993 | Kovacs et al. | 148/612 |
| 5,478,523 A | * | 12/1995 | Brusso et al. | 420/99 |
| 6,413,328 B2 | * | 7/2002 | Takayama et al. | 148/319 |
| 2006/0021679 A1 | * | 2/2006 | Takayama et al. | 148/218 |

FOREIGN PATENT DOCUMENTS

| | | | |
|---|---|---|---|
| EP | 950723 A1 | * | 10/1999 |
| JP | 51-59007 | | 5/1976 |

* cited by examiner

*Primary Examiner* — Jie Yang
(74) *Attorney, Agent, or Firm* — Wenderoth, Lind & Ponack, L.L.P.

(57) ABSTRACT

A ferrous seal sliding part excellent in heat crack resistance, seizure resistance and abrasion resistance is provided. The ferrous seal sliding part has a seal sliding surface, wherein the seal sliding surface has a quench hardened layer having a structure in which a martensite parent phase forms a solid solution with carbon of 0.15 to 0.6 wt % and contains cementite dispersed therein in a content of 3 to 50% by volume.

7 Claims, 10 Drawing Sheets

PEARLITELY STRUCTURE OF EUTECTOID STEEL

GRAY CAST IRON

PEARLITELY STRUCTURE OF EUTECTOID STEEL

GRAY CAST IRON

SPHEROIDAL GRAPHITE CAST IRON

WHITE CAST IRON

FERROUS SEAL SLIDING PARTS AND PRODUCING METHOD THEREOF

FIELD OF THE INVENTION

The present invention relates to ferrous seal sliding parts used for rollers, idlers and reduction gears for construction machines and producing methods thereof.

BACKGROUND OF THE INVENTION

A track roller assembly and a reduction gear apparatus of a construction machine are equipped with ferrous floating seal parts for the purpose of preventing leakage of lubrication oil from inside thereof as well as entering of earth and sand therein. Accordingly, such floating seals are widely produced by applying adequate treatment in such that a seal sliding surface thereof is quenched to have a hard martensite structure, or a large amount of hard cementite and $Cr_7C_3$ carbide are crystallized in 30% by volume while transforming a parent phase to a martensite structure by quenching in order to improve seizure resistance and abrasion resistance. An exemplary floating seal is made by using a high-carbon and high-Cr cast iron or a Ni-hard cast iron (for example, as shown in Japanese Patent Publication (KOKAI) No. S51-59007).

In addition, a ferrous floating seal in which abrasion-resistant material is thermal-sprayed to a seal sliding surface thereof may be used for some purposes.

In the ferrous floating seal used for the purpose of sealing a lubrication oil in the reduction gears and the track rollers, a seal sliding surface thereof is abraded as fine particles of earth and sand are entered in the seal sliding surface by hulling motion in the earth and sand, and is lubed with the lubrication oil sealed therein. Accordingly, a ferrous floating seal capable of withstanding a very severe lubrication condition is required. Even if a most conventionally used hard ferrous floating seal part made of a high-carbon and high-Cr cast iron is applied, when setting pressure (press force) at assembling is high, considerable quenching crack (heat crack), seizure and abnormal abrasion occur on the seal sliding surface, resulting in leakage of oil.

And, even if various tool steels such as a cold work tool steel and a high speed steel (SKH material) are employed to increase the seizure resistance and the abrasion resistance, seizing due to defect of seizure resistance easily occurs, resulting in insufficient heat crack resistance and abrasion resistance. In addition, since such steels are very expensive, they have a problem that cost of material increases in view of material yield before a product is finished.

And, in resent years, construction machines such as a bulldozer are required to drive at a high speed for improvement in working efficiency, and therefore, the ferrous floating seal necessarily rotates at a high speed. This also causes quenching crack, seizure and abnormal abrasion, resulting in leakage of oil.

In order to solve the above-mentioned problems, an object of the present invention is to provide ferrous seal sliding parts excellent in heat crack resistance, seizure resistance and abrasion resistance and a producing method thereof.

SUMMARY OF THE INVENTION

A ferrous seal sliding part according to the present invention has a seal sliding surface, wherein the seal sliding surface has a quench hardened layer having a structure in which a martensite parent phase forms a solid solution with carbon of 0.15 to 0.6 wt % and contains cementite dispersed therein in a content of 3 to 50% by volume.

Here, the seal sliding part includes a ferrous floating seal.

A ferrous seal sliding part according to the present invention has a seal sliding surface, wherein the seal sliding surface has a quench hardened layer having a structure in which a martensite parent phase forms a solid solution with carbon of 0.15 to 0.7 wt % and contains cementite in a content of 3 to 50% by volume and graphite in a content of 3 to 15% by volume dispersed therein.

A producing method of a ferrous seal sliding part according to the present invention comprises a preparing step for preparing a steel product containing carbon of 0.5 to 1.8 wt % and further one or more alloy element selected from the group consisting of Cr of 0.3 to 3 wt %, V of 0.1 to 0.5 wt %, Mo of 0.3 to 2 wt % and W of 0.5 to 2 wt %; and a quenching step for heating the steel product at a heating rate such that temperature rises from A1 transformation temperature to a quenching temperature in the range of 850 to 1100° C. within 10 seconds and then rapidly cooling.

Here, the steel product may be formed in a shape of a ferrous seal sliding part.

A producing method of a ferrous seal sliding part according to the present invention comprises a preparing step for preparing a cast iron selected from the group consisting of a gray cast iron, a nodular graphite cast iron, a vermicular graphite cast iron and a pearlite malleable cast iron, in which graphite is dispersed in a parent phase having a pearlite structure containing carbon of 2 to 4.5 wt % and further one or more alloy element selected from the group consisting of Cr of 0.5 to 4 wt %, V of 0.1 to 0.5 wt %, Mo of 0.3 to 2 wt % and W of 0.5 to 2 wt %; and a quenching step for heating the cast iron at a heating rate such that temperature rises from A1 transformation temperature to a quenching temperature in the range of 850 to 1100° C. within 10 seconds and then rapidly cooling.

Here, the cast iron may be formed in a shape of a ferrous seal sliding part.

A producing method of a ferrous seal sliding part according to the present invention comprises a preparing step for preparing a white cast iron containing carbon of 2 to 4.5 wt % and further one or more alloy element selected from the group consisting of Cr of 0.5 to 4 wt %, V of 0.1 to 0.5 wt %, Mo of 0.3 to 2 wt % and W of 0.5 to 2 wt %, or a cast iron in which cementite in the white cast iron is partially graphitized; and a quenching step for heating the cast iron at a heating rate such that temperature rises from A1 transformation temperature to a quenching temperature in the range of 850 to 1100° C. within 10 seconds and then rapidly cooling.

Here, the cast iron may be formed in a shape of a ferrous seal sliding part.

As described above, the present invention will provide ferrous seal sliding parts excellent in heat crack resistance, seizure resistance and abrasion resistance and a producing method thereof.

DETAILED DESCRIPTION OF EMBODIMENT OF THE INVENTION

Figure 1A:
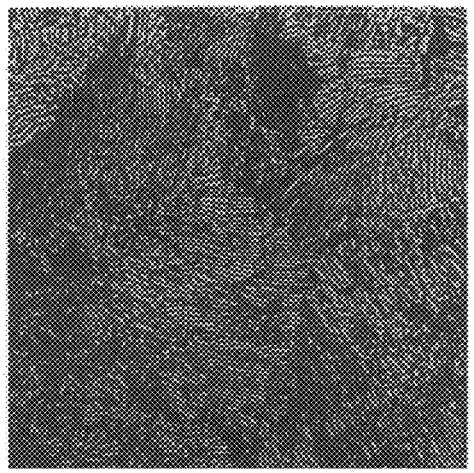
FIG. 1(a) to FIG. 1(d) are photographs showing a structure of each cast iron having a pearlite structure for a ferrous floating seal.

In the present invention, rapid induction heating and cooling results in that a quench hardened layer is formed at the seal sliding surface. The quench hardened layer has a layered structure region comprising hard platy cementite and a low carbon martensite phase excellent in thermal shock resistance in a total content of 20% or more by area (pearlitely structure region, call the cementite in the pearlitely structure region as pearlitely cementite) whereby cementite including the platy cementite is dispersed therein in 3 to 50% by volume. This increases capability for applying a lubricating oil onto a seal sliding surface and achieves a ferrous seal sliding part excellent in tempering-softening resistance and heat crack resistance. And, since an unhardened layer remains in the ferrous sliding part partially, a ferrous seal sliding part having toughness can be obtained. Although radiant heating and salt bath heating may be applicable as substitute for the rapidly induction heating, the rapidly induction heating is preferable from the viewpoint of productivity and economical efficiency.

A ferrous floating seal, which is one example of a ferrous seal sliding part, capable of withstanding the severe condition requires to have a seal sliding surface excellent in seizure resistance, which can be improved by increasing heat crack resistance. Therefore, the present invention provides a ferrous floating seal, in which at least seal sliding surface thereof is quench hardened (a quench hardened layer) by induction heating quenching. As the result, the seal sliding surface has a structure in which an amount of carbon which forms a solid solution with a martensite parent phase is so adjusted to 0.15 to 0.6 wt % that heat crack resistance of the seal sliding surface can be improved. And, the structure has further hard cementite available for increasing abrasion resistance and seizure resistance dispersed in the martensite parent phase in a content of 3 to 50% by volume.

A ferrous floating seal part according to the present invention has a seal sliding surface, wherein the sliding surface has a martensite parent phase which forms a solid solution with carbon of 0.15 to 0.7 wt %. And, in the martensite parent phase, graphite in a content of 3 to 15% by volume, in addition to cementite in a content of 3 to 50% by volume, are dispersed.

The reason that the lower limit of a content of the cementite to be dispersed is adjusted to 3% by volume is such that an effect to improve seizure resistance is sufficiently demonstrated by dispersing hard particles under a conventional sliding condition, and as a result, abrasion resistance is also improved. In addition, in order to further improve abrasion resistance to entering of earth and sand, it is effective that harder carbide, nitride and carbonitride are dispersed in a larger amount. For example, in a case of a high-carbon and high-Cr cast iron, a content of $Cr_7C_3$ carbide to be dispersed is adjusted in 35 to 50% by volume. Accordingly, it is preferable that the upper limit of a content of cementite to be dispersed is set to 50% by volume and the lower limit thereof is set at 10% by volume. Another reason that the upper limit of a content of cementite to be dispersed is set at 50% by volume is that when a content of the cementite exceeds 50% by volume, the ferrous floating seal becomes brittle excessively.

In the ferrous floating seal made of the aforesaid high-carbon and high-Cr cast iron, it is presumed that a martensite phase excellent in heat crack resistance contains carbon of about 0.8 wt %. Thus, the upper limit of an amount of carbon which forms a solid solution with a martensite parent phase is preferably set at 0.7 wt %. However, in view of a concentrations of carbon contained in a hot work tool steel (SKD6, SKD7, SKD61, SKD62, SKD8 and 3Ni-3Mo steel) and the like which requires high heat crack resistance, it is preferable that the upper limit of an amount of carbon which forms a solid solution with a martensite parent phase is set at 0.6 wt % and the lower limit thereof is set at 0.15 wt %.

Further, in order to improve abrasion resistance to earth and sand, it is preferable that hardness of a martensite parent phase is HRC50 or more. In addition, in order to ensure heat crack resistance stable, it is more preferable that an amount of carbon contained in a martensite parent phase is adjusted to 0.2 to 0.5 wt %.

It is thought that abrasion resistance to earth and sand necessary for a ferrous floating seal is improved as the dispersed carbide is MC-type carbide, $Cr_7C_3$ or $M_6C$ special carbide and has higher hardness. However, when the carbide is too hard, scraping characteristic against the counterpart surface to the seal sliding surface becomes large, resulting in heat generation, therefore causing seizure and heat crack easily. Accordingly, in the present invention, it is preferable that comparatively soft cementite having hardness of about Hv1000 to 1300 is dispersed.

Graphite is used as a solid lubrication and an oil pocket to improve lubricating property, therefore to improve seizure resistance. A content of the graphite is preferably adjusted such that the lower limit thereof is 3% by volume, at which improvement in lubricating property is apparently demonstrated, and the upper limit thereof is 15% by volume which is a maximum amount contained in a conventional cast iron. And, the upper limit is more preferably 10% by volume at which improvement in lubricating property is saturated and toughness is obtained.

In order to improve lubricating property under the aforesaid severe sliding condition of a ferrous floating seal, a ferrous floating seal according to the present invention has a layered structure region (colony) in which pearlitely (platy) cementite showing an oil pocket effect for receiving an lubricating oil on a sliding surface is dispersed in a martensite phase in layers. The layered structure region is dispersed in a martensite parent phase of the seal sliding surface of the ferrous floating seal in an area ratio of 20% or more. This improves seizure resistance and heat crack resistance of the seal sliding surface. In addition, cementite, including the pearlitely cementite and the other cementite, is dispersed in a hard martensite parent phase in a total content of 3 to 50% by volume so that abrasion resistance to earth and sand will be improved.

And, since the dispersed pearlitely cementite is harder than the hard martensite phase which exists among the dispersed pearlitely cementite, an area other than the dispersed pearlitely cementite serves as an oil pocket for receiving a lubricating oil so that lubricating property will be improved, and therefore seizure resistance will be improved and occurrence of heat crack will be prevented.

FIG. 1(a) is a photograph showing a structure (a pearlitely structure) in which a steel product having a substantially eutectoid carbon concentration (carbon concentration of 0.8 wt %) is cooled from an austenite state to cause pearlite transformation. In the figure, area with gray color shows cementite and area with white color shows ferrite phases. FIG. 1(a) shows that a large number of pearlite transformed regions (colonies) are aggregated, resulting in almost all areas becoming to have a pearlite transformed structure. In the present invention, the pearlitely colonies comprising a cementite-martensite phase are formed such that a steel product which has a pearlite transformed structure comprising cementite and ferrite phase before induction quenching (induction heating quenching) is rapidly heated and rapidly cooled so that the ferrite will be transformed to martensite while the cementite does not dissolve but remains. From the result, an area ratio of the pearlitely colonies is larger than the eutectoid concentration of the steel product and is almost 100% by area in view of a phase diagram, at which a content of the cementite does not exceed 12% by volume. Therefore, it is preferred that a larger amount of granulated cementite should be dispersed from the viewpoint of improvement in abrasion resistance. In the present invention, it is possible that granulated cementite is dispersed in the pearlitely cementite dispersed region in a content of as large as 20% by volume. And, in the viewpoint of improvement in lubricating property of a sliding surface, for example, an oil groove of 15% by area of a sliding surface of a conventional bearing apparently improves its lubricating property. From this result, it is preferable that an area ratio of the pearlitely cementite colony is 20% or more by area and it is more preferable that a content of the pearlitely cementite colony is 50% or more by volume.

Figure 1B:
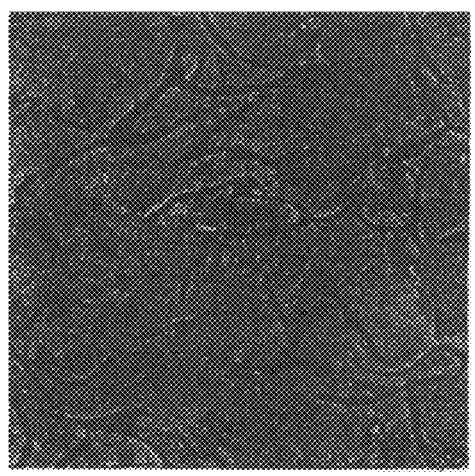
Figure 1C:
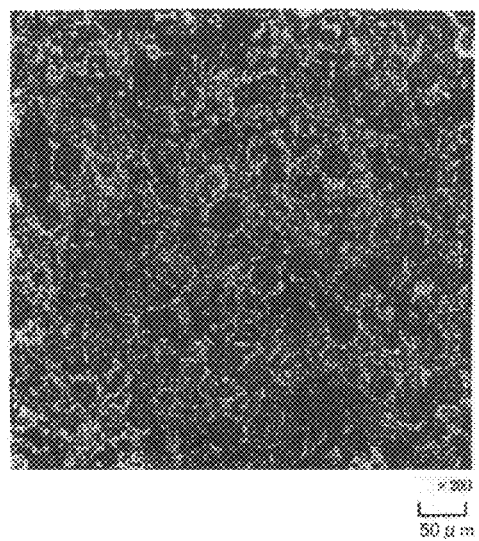
Figure 1D:
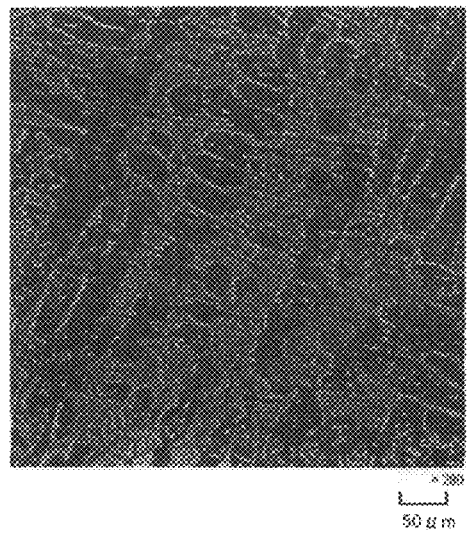

And, FIG. 1(b) to FIG. 1(d) are photographs showing structures of typical cast irons in which each parent phase thereof is the aforesaid pearlitely structure. FIG. 1(b) is a photograph showing a gray cast iron in which graphite flakes are dispersed, FIG. 1(c) is a photograph showing a nodular graphite cast iron in which spheroidal graphite is dispersed, FIG. 1(d) is a photograph showing a white cast iron comprising cementite (white phases) and a pearlite structure (black areas) in ledeburite. These cast irons are also applicable for the present invention.

It is difficult from the viewpoint of an equilibrium phase diagram to densely disperse cementite (granulated cementite and pearlitely cementite) in a quenched martensite parent phase which forms a solid solution with carbon of 0.15 to 0.7 wt % according to the present invention. To disperse cementite in the quenched martensite parent phase densely, a ferrous floating seal according to the present invention has a seal sliding surface, which is formed by a steel product containing carbon of 0.5 to 1.8 wt % and one or more alloy element selected from the group consisting of Cr of 0.3 to 3 wt %, V of 0.1 to 0.5 wt %, Mo of 0.3 to 2 wt % and W of 0.5 to 2 wt %, which are alloy elements concentrated in cementite remarkably. And, it is preferable that the steel product is preheated under a heating condition in which at least either one of ferrite phase or austenite phase coexists with cementite to heighten a content of Cr contained in the cementite in the steel product up to at least 2.5 wt % or more, preferably 3 wt % or more. This prevents forming a solid solution of cementite with an austenite phase during heating at induction hardening. The steel product is substantially made of iron containing carbon and the aforesaid alloy elements, and it is preferable to be added one ore more alloy element selected from the group consisting of Si, Al, Mn, Ni, Cr, V, Mo, W, Cu, Co, B, Ti, Nb, Zr, P, S, Ca, Pb and Mg in the viewpoint of improvement in hardenability, tempering-softening resistance, corrosion resistance, machineability, abrasion resistance and seizure resistance, in addition to improvement achieved by the present invention. And, in some cases, the alloy element and one or more impurity element selected from the group consisting of S, P, O and N get mixed in the steel product to produce the steel product. So, such alloy elements may get mixed as far as they have little effect on the purpose of the present invention. The steel product, as well as a later-described cast iron, substantially made of iron means a steel product to which the alloy elements and the impurity elements are suitably contained.

A ferrous floating seal according to the present invention has a seal sliding surface, wherein the seal sliding surface has a martensite parent phase which forms a solid solution with carbon of 0.15 to 0.7 wt % and contains cementite in a content of 3 to 50% by volume and graphite in a content of 3 to 15% by volume dispersed therein.

In the ferrous floating seal part, it is possible that the sliding surface is formed by using one of cast irons selected from the group consisting of a gray cast iron, a nodular graphite cast iron, a vermicular graphite cast iron (or a compacted vermicular graphite cast iron) and a pearlite malleable cast iron, wherein the cast iron has a structure in which graphite in a content of 3 to 15% by volume is dispersed in a parent phase having a pearlite structure containing carbon of 2 to 4.5 wt % and further one or more alloy element selected from the group consisting of Cr of 0.5 to 4 wt %, V of 0.1 to 0.5 wt %, Mo of 0.3 to 2 wt % and W of 0.5 to 2 wt %.

In the ferrous floating seal part, it is also preferable that the seal sliding surface is formed by using a white cast iron containing carbon of at least 2 to 4.5 wt % and one or more alloy element selected from the group consisting of Cr of 0.5 to 4 wt %, V of 0.1 to 0.5 wt %, Mo of 0.3 to 2 wt % and W of 0.5 to 2 wt %, or a cast iron in which cementite of the white cast iron is partially graphitized so that cementite in a content of 15 to 50% by volume and graphite in a content of 3 to 15% by volume will be dispersed in a martensite parent phase or a parent phase composed of pearlitely cementite and a martensite phase which forms a solid solution with carbon of 0.15 to 0.7 wt %.

And, when a steel product in which a ferrite phase coexistent with a cementite phase before quenching is equilibrium heated at 700° C., a distribution coefficient αKM of an alloy element M is shown by dividing a concentration (wt %) of the alloy element M in the cementite phase by a concentration (wt %) of the alloy element M in the ferrite phase, for example, each distribution coefficient is represented as follows; αKCr of Cr=28, αKMn of Mn=10.5, αKV of V=9, αKMo of Mo=7.5, αKW of W=2, αKNi of Ni=0.34, αKCo of Co=0.23, αKSi of Si=approximately 0 and αKAl of Al=approximately 0. From the distribution coefficients, it is understood that Mn, Cr, Mo, V and W are concentrated in cementite; Si, Al, Ni and Co are concentrated in ferrite. Therefore, for example, when cementite is dispersed in a ferrite phase in 50% by volume as described above, Si, Al, Ni and Co are concentrated in the ferrite phases each having a concentration of about 2 times, about 2 times, about 1.5 times and about 1.6 times that of the added amount, respectively, while Cr and Mn are diluted in the ferrite phases each having a concentration of about 0.07 times and about 0.17 times that of the added amount, respectively.

As for a heat treatment method for concentrating Cr in cementite before induction hardening, various treatment methods are applicable, such as a method for heating a steel having a martensite structure or a pearlite structure in a two-phase region of ferrite and cementite, a method for cooling at a slow cooling rate such as a air-cooling or a furnace-cooling at a stage of a pearlite structure formation, a constant-temperature treatment in the range of A1 transformation temperature to 600° C. and a spheroidizing treatment of cementite (as described in Iron and Steel Institute of Japan, "Heat Treatment of Steel: basis and operation standard", MARUZEN Co. Ltd, p 44 to 46).

Furthermore, in a case of a steel having a carbon concentration larger than a eutectoid carbon concentration, a pre-heat treatment is also preferably applied, in which the steel is maintained with being heating at a two-phase region of austenite and cementite in the range of A1 transformation temperature to Acm transformation temperature to concentrate Cr in the cementite and then cooled so as to transform a parent phase to a martensite, a bainite and/or a fine pearlite structures. Alternatively, in the pre-heat treatment, it is also preferred that after maintaining with being heating, the steel is slow-cooled to 600° C. to disperse granulated cementite and/or pearlite cementite. In addition, Cr in the cementite in the two-phase region of austenite and cementite, within a temperature range of 750 to 850° C., is concentrated to have a concentration about 8 to 10 times a concentration of Cr in the austenite. For example, when a steel containing carbon of 0.9 wt % and Cr of 1.5 wt % is maintained with being heated at 820° C., the steel is transformed to have a structure in which cementite containing Cr of 11 wt % is dispersed in about 2% by volume. Accordingly, as described later, applying induction hardening causes the dispersed cementite to remain without forming a solid solution.

The process in which cementite is dispersed in a low-carbon martensite parent phase containing carbon of 0.15 to 0.7 wt % can be explained by using a solid solution formation mechanism (velocity) of cementite which forms a solid solution with austenite when a material composed of the aforesaid Cr concentrated cementite and a ferrite phase is maintained with being heating at a quenching temperature by rapidly heating such as induction hardening. The solid solution formation mechanism can be understood by using a relation between a ternary phase_diagram of iron, carbon and M (an alloy element) at a heating temperature as shown in FIG. 2 and a constant carbon activity line as shown in the figure.

Figure 2:
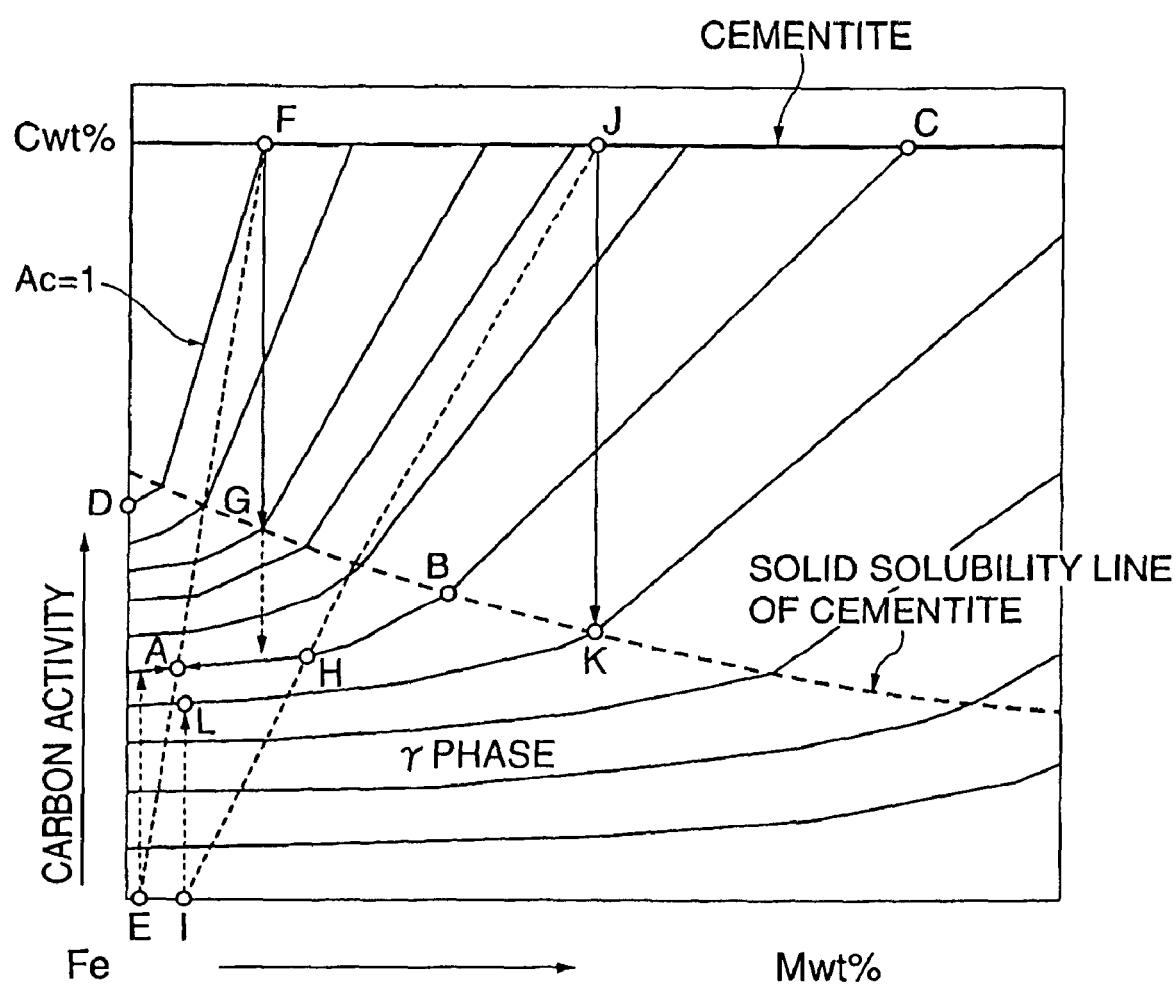
FIG. 2 is a graph showing a solid-solution formation mechanism of γ phase by using a phase diagram of iron, carbon and M and constant carbon activity lines.

FIG. 2 is a graph schematically showing a ternary phase diagram of iron, carbon and an alloy element M which has almost the same affinity with carbon as that of Cr. In the present invention, a ferrous floating seal having a seal sliding surface is provided, wherein the seal sliding surface is formed by a steel product which contains carbon of 0.5 to 1.8 wt %, at least either one of Cr of 0.3 to 3 wt % or V of 0.1 to 0.5 wt %, one or more alloy elements selected from the group consisting of Si, Al, Mn, Ni, Mo, W, Cu, Co, B, Ti and P, impurity elements of S, O and N and a residue of iron. A typical composition of the steel product is represented a point A in FIG. 2. A carbon activity equal to a carbon activity of the steel transfers as represented in a thin line passing through the point A. Specifically, the constant carbon activity line changes upward because carbon activity is decreased as an addition amount of the alloy element M increases. Then, the constant carbon activity line crosses with a line showing solid solubility of cementite at a point B, and then linearly connected at a point C showing a composition of cementite containing an alloy element M at equilibrium with the crossing point (the point B).

Another constant carbon activity lines (as represented in thin lines) in FIG. 2 are determined according to each carbon activity. A carbon activity becomes higher as its carbon concentration increases. Here, a carbon activity Ac is defined as 1 at a point D showing solid solubility of graphite along an iron-carbon axis (a binary phase diagram of iron and carbon).

Each composition of ferrite and cementite in the steel having the composition shown at the point A in FIG. 2 is shown in a point E and a point F, respectively. On rapid heating to a quenching heating temperature, the cementite having the composition of the point F is transformed such that the alloy element M remains but carbon having significant high diffusion ability forms a solid solution with austenite rapidly. At this time, a composition of an austenite boundary at local equilibrium with a cementite boundary is shown in a point G. Here, since a carbon activity at the point G is larger than the carbon activity of the steel of the point A, carbon diffuses rapidly due to a gradient of chemical potential of carbon. Then, at a region where cementite has formed a solid solution and regions where were being originally ferrite, carbon is first homogenized along a constant activity line passing through the point B, as shown in the figure, and then the alloy element is second homogenized.

However, when a large amount of the alloy element M is added in the steel (a point H) and therefore a large amount of the alloy element M concentrates in the cementite (a point J), a carbon activity (a point K) of austenite equilibrium to the cementite, which is transformed such that the alloy element M remains but carbon forms a solid solution with cementite, becomes lower than a carbon activity at the point H. So, while carbon rapidly diffuses to a concentration as shown in a point L along a constant carbon activity line passing through a point K for a very short period, a solid solution formation proceeds more rapidly, as the result, the cementite can not form a solid solution without diffusion of the alloy element M along a solid solution line of cementite from the point K to the point B while the cementite is completely forming a solid solution. And, a solid solution formation of cementite is suddenly suppressed by a rate-controlling of the diffusion of the alloy element M.

And, a period in which the cementite completely forms a solid solution becomes longer, as a concentration of the alloy element M in the cementite becomes larger than a concentration of the alloy element M of the point B at which a constant carbon activity line passing through the point A and the point H is crossed with a solid solubility line of the cementite. In order to decrease the amount of the cementite which does not form a solid solution at high-frequency heating (induction heating), it is necessary that a concentration of the alloy element M in the cementite is adjusted to a concentration smaller than that of the alloy element M of the point B. And, since a carbon concentration of the point L along a constant carbon activity line passing through the point K is almost corresponding to a carbon concentration of a martensite parent phase in which cementite is dispersed without forming a solid solution, it is preferable that a carbon concentration of the point L may be set at 0.15 to 0.7 wt % according to the present invention. And, it is necessary to regulate a J point of cementite, at which a carbon concentration of the L point is 0.15 to 0.7 wt %.

A composition of regions where cementite forms a solid solution around cementite which is diffused without forming a solid solution has substantially the same composition as that at the point K in FIG. 2. The alloy element concentration of the region is significantly higher than those of the point L and the point H, and therefore a carbon concentration becomes easily higher. Accordingly, it is found that a martensite transformation temperature Ms of the regions moves to lower so that it will be likely to form a retained austenite phase excellent in toughness and conformability around the cementite which does not form a solid solution.

Figure 3:
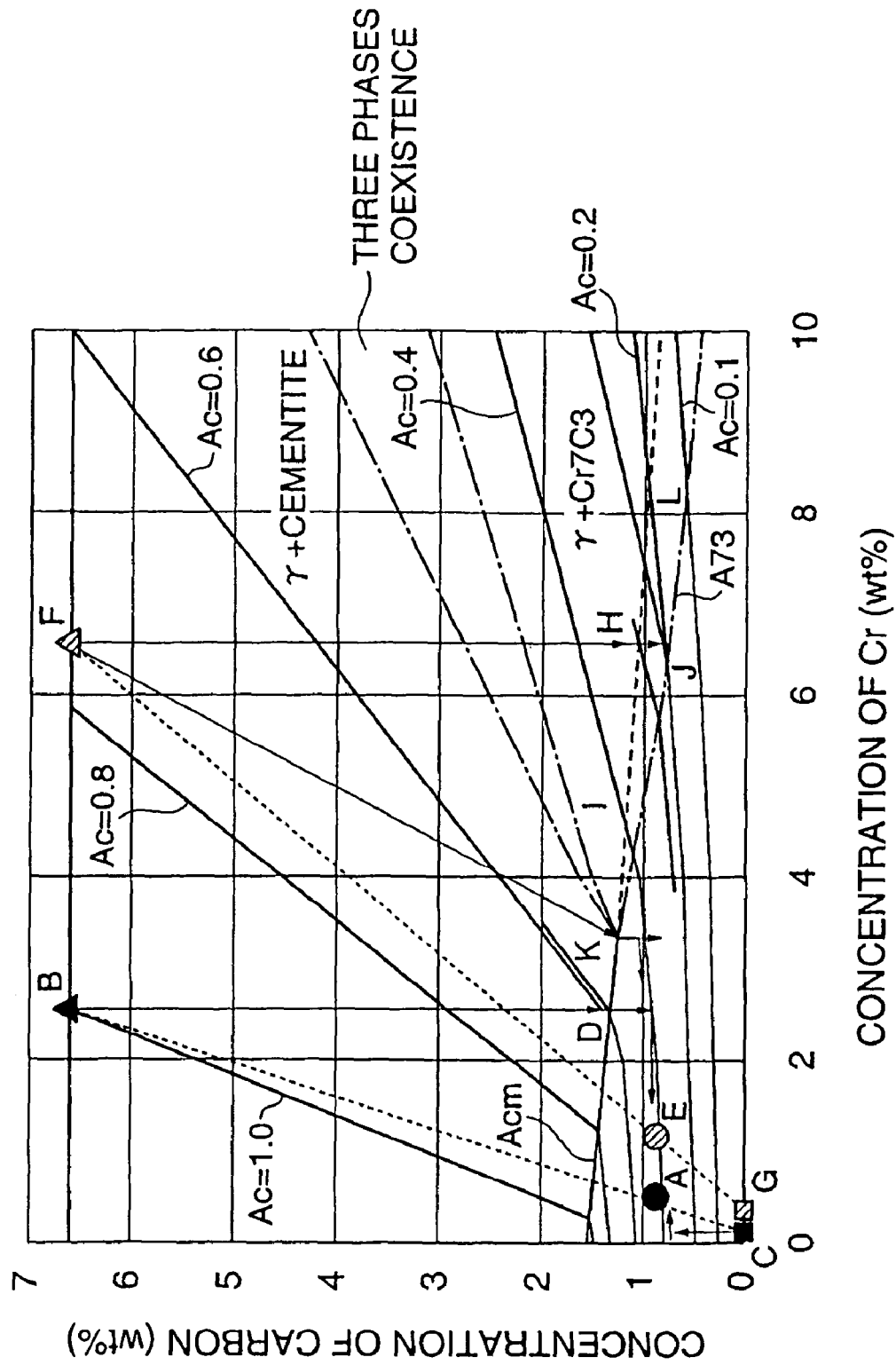
FIG. 3 is a graph showing constant carbon activity lines of iron, carbon and Cr (at 1000° C.).

More specifically, induction hardening in which a quenching treatment is carried out by rapidly heating at 1000° C. will be studied by using a ternary phase diagram of iron, carbon and Cr, as shown in FIG. 3, and constant carbon activity lines (at 1000° C.).

(1) A case in which cementite rapidly forms a solid solution (a case in which a concentration of Cr in cementite is low).

When a steel shown as the point A of the figure (which has carbon of 0.8 wt % and Cr of 0.4 wt %) is sufficiently heated at 700° C. in the region in which cementite coexists with ferrite, the steel is transformed to have a composition of the point B (cementite, Cr of 2.6 wt %) and the point C (ferrite, Cr of 0.09 wt %). Then, when the steel having the transformed composition is rapidly heated by induction heating to a temperature of 1000° at which the steel becomes an austenite state, the point B and the point C transfer toward the point A, along the arrows in the figure, causing the ferrite and the cementite to be homogenized. As described above, carbon rapidly diffuses, as shown in arrows of the figure, in the austenite (the point C) which had originally a ferrite structure via the point D while the alloy element contained in the cementite of the point B is hardly being diffused in the austenite. After the cementite has formed a solid solution, Cr element is gently homogenized toward the point A along the constant carbon activity line passing through the point A with diffusion of Cr. And, at a point in which the cementite forms a solid solution completely by more rapidly induction heating, a carbon concentration of a martensite parent phase becomes equal to that of the point A, so that martensite having higher hardness will be obtained.

Accordingly, a concentration Cr in the cementite is about 4.5 wt %, when a concentration of carbon which forms a solid solution with a martensite phase according to the present invention is 0.7 wt %, whereby it appears that regulating a concentration of Cr in the cementite to 4.5 wt % or less prevents remaining of cementite which does not form a solid solution.

(2) A case 1 in which a solid solution formation of cementite drastically delays.

When a steel shown as the point E of the figure (which has carbon of 0.8 wt % and Cr of 1 wt %) is sufficiently heated at 700° C. in the region in which cementite coexists with ferrite, the steel is transformed to have a composition of the point G (ferrite, Cr of 0.24 wt %) and the point F (cementite, Cr of 6.61 wt %). Then, when the steel having the transformed composition is rapidly heated by induction heating to a temperature of 1000° C. at which the steel becomes an austenite state, as similar to the aforesaid embodiment, the point F transfers toward the point H, causing a solid solution formation of cementite with ferrite. Since a carbon activity at the point H (an austenite boundary having a carbon activity equal to that of the cementite which forms a solid solution) becomes lower than that at the point E, the cementite first forms a solid solution by the carbon diffusion rate controlling mechanism to a constant carbon activity line passing through the point H. And then, a composition (the point H) of a γ phase at equilibrium with the cementite transfers along a solid solubility line of the cementite toward the point I, having the same carbon activity as the point E, on a solid solubility line of the cementite. This results that the cementite forms a solid solution associated with diffusion of Cr, and then the cementite completely forms a solid solution when a composition of the γ phase has a composition of the point I. And, a concentration of carbon in the martensite parent phase after quenching is about 0.5 wt %, and therefore, it is found that the cementite of about 5% by volume is dispersed without forming a solid solution in a very hard martensite phase.

And, when a concentration of carbon in the martensite parent phase is 0.15 wt %, the upper limit of a concentration of Cr in a cementite phase is about 12 wt %. Accordingly, under a quenching condition in which after rapidly heating to a quenching temperature of 1000° C. and then cooling is applied, adjusting a concentration of Cr in a cementite phase to 4.5 to 13 wt % makes it possible to obtain a quench hardened layer in which cementite is dispersed in a martensite parent phase having carbon of 0.15 to 0.7 wt % without forming a solid solution.

(3) A case 2 in which the solid solution formation of cementite drastically delays.

The point H in the case of (2) assumes that a two-phase equilibrium in which $Cr_7C_3$ carbide different from cementite is equilibrium to a γ phase and the unequilibrated cementite is equilibrium to the γ phase is formed during a solid solution formation of the cementite. In such a solid solution formation process of cementite, cementite forms a solid solution by the carbon diffusion rate controlling mechanism to a constant carbon activity line (about 0.2) passing through the point J on a solid solubility line of $Cr_7C_3$ carbide. In the subsequent process of the solid solution formation of the cementite, a restriction condition, in which a composition of a γ phase boundary is changed from at least the point J at which $Cr_7C_3$ carbide does not precipitate, along a solid solubility line of $Cr_7C_3$ carbide toward the point K in a three-phase (γ phase and cementite phase and $Cr_7C_3$ phase) coexistence region where the $Cr_7C_3$ carbide does not need to precipitate, is added so that it is not necessary to form $Cr_7C_3$ carbide before disappearance of the cementite. The restriction condition causes delay in forming a solid solution of cementite.

In such a case, a concentration of carbon in a martensite parent phase obtained by the induction heating and quenching is about 0.4 wt %, and cementite of about 6% by volume is dispersed without forming a solid solution in the hard martensite parent phase having hardness of HRC 57 to 61.

From the studied results, the limit point at which a significant delay in a solid solution formation of cementite occurs is a case where Cr is concentrated in cementite to have a concentration of about 3.5 wt % or more under a heating condition of 1000° C. When under a heating condition of 900° C., a concentration of Cr in cementite is about 2.5 wt % (when under a heating condition of 800° C., it is about 2 wt %). For example, when a steel containing carbon of 0.55 wt % and Cr of 0.3 wt % is heated at 700° C., a concentration of Cr in the cementite is 2.6 wt %, obtained by using the following equation.

A concentration of Cr=αKCr×a concentration of Cr in a steel/(1−(a concentration of carbon in a steel/6.67)×(1-αKCr)).

Accordingly, the lower limit of the addition amount of Cr is about 0.3 wt %, and more preferably about 0.5 wt % or more.

In order to disperse cementite without forming a solid solution stably, it is necessary that an average amount of Cr in cementite is 2.5 to 15 wt %, preferably 3.5 to 13 wt %.

αKCr shows a distribution coefficient showing a degree of concentrating of Cr between ferrite phase and cementite. Each distribution coefficients at 600° C. is represented as follows; αKCr of Cr=52, αKMn of Mn=19 and αKMo of Mo=12. It has been known that the higher the distribution coefficient of an alloy element is, the higher the alloy element tends to concentrate in the cementite.

When an amount of Cr in the cementite is adjusted to 2.5 wt % or less, in a case in which rapidly induction heating is carried out, a solid solution formation of cementite is delayed by a moving resistance of a boundary between cementite phase and austenite phase, in addition to the mechanism in which cementite forms a solid solution depending to the carbon diffusion rate controlling, whereby it is expected that cementite is dispersed without forming a solid solution in a quench hardened layer. It will be achieved by quenching just after rapidly heating from A1 transformation temperature to a quenching temperature at a heating rate of 500° C./sec or more. However, since an amount of carbon which forms a solid solution with martensite is unable to be adjusted and a solid solution formation of Cr with cementite causes hardness of cementite to be higher (up to Hv1300), addition of Cr is indispensable.

And, Mn is an element which has a distribution coefficient αKMn higher than distribution coefficients αKV of V and αKMo of Mo and is easily to concentrate in cementite. However, in an amount range (0.3 to 2 wt %) of Mn added to a conventional steel, Mn does not form special carbide having an austenite structure and has behavior to decrease carbon activity in austenite less than about half of the behavior of Cr. Accordingly, Mn effects less on delay in a solid solution formation of cementite. However, since Mn significantly contributes to a formation of retained austenite by the aforesaid mechanism and to hardenability, it is preferable that Mn is added within an amount range (0.1 to 2 wt %) of Mn added to a conventional steel.

A distribution coefficient αKM of an alloy element M between cementite phase and ferrite was determined when sufficiently heated at 700° C. as described above. So, when heated at 600° C., a distribution coefficient each of Cr, Mn, V and Mo becomes higher, and therefore Cr, Mn, V and Mo are concentrated in cementite more densely. However, if a heating period is too short, such an alloy element does not sufficiently concentrate, whereby a pre-heat treatment at a eutectoid temperature or less is preferably carried out.

A distribution coefficient αKM is constant, even if the cementite is pearlitely cementite. Accordingly, it is preferred that a steel having a pearlite transformed structure before induction quenching is heat-treated at a temperature lower than a eutectoid temperature of the steel.

And, in order to prepare a structure in which pearlitely cementite and cementite particle will be dispersed, it is preferable that cementite is precipitated and dispersed as granulate state in a temperature range in which austenite and cementite exist at equilibrium and then pearlite transformation is caused while being cooled.

Alloy elements such as V, Cr, Mo and W, each having high distribution coefficient between ferrite and cementite, not only concentrate in cementite easily but also form carbide such as $Fe_{21}MO_2C_6$, $V_4C_3$ and WC special carbide, similar to $Cr_7C_3$ carbide described in the case(3), whereby the same study as the $Cr_7C_3$ was carried out. As a result, an addition of V of 0.1 wt % or more, Mo of 0.3 wt % or more and W of 0.5 wt % or more causes delay in a solid solution formation of cementite. Accordingly, in the present invention, in the viewpoint of economical efficiency, it is preferable that V, Mo and W are added by mixture, if necessary, in addition to Cr of 0.3 wt % or more.

And, when V of over 0.05 wt % is added, it is crystallized as $V_4C_3$ carbide in a steel before induction quenching. The $V_4C_3$ carbide remains in a martensite parent phase with forming little solid solution, even if induction hardening is applied thereto. Since the $V_4C_3$ is remarkable hard carbide and demonstrates considerable improvement in abrasion resistance when applied to the aforesaid high-speed steel, it is preferred that the addition amount thereof is adjusted to 0.05 to 5 wt % (0.1 to about 10% by volume) in view of the high-speed steel.

Accordingly, a ferrous floating seal according to the present invention has a seal sliding surface, wherein the seal sliding surface contains one or more alloy elements selected from the group consisting of V, Ti, Zr, Nb, Ta and Hf in a total amount of 0.05 to 5 wt % so that at least any one of carbide, nitride and carbonitride of the alloy elements, having an average grain size of 0.1 to 5 μm, will be dispersed in a total content of 0.1 to 10% by volume.

And, for the purpose of more improvement in abrasion resistance, it is preferable that an addition amount of V is adjusted to 0.5 wt % or more, and more preferably to 1 wt % or more.

Cementite other than the pearlitely cementite contains Cr of an average concentration of 2.5 to 15 wt %. Such the cementite may be crystallized at previous austenite grain boundaries, and preferably may be granulated cementite having an average grain size of 0.1 to 10 μm from the viewpoint of strength. And, abrasion resistances of a sliding material and a tool steel are well improved when a grain size of carbide contained therein is large, and frictional force caused by sliding affects mainly a region within a depth of about 10 μm below the sliding surface. From the results, it is preferable that the upper limit of an average grain size of granulated cementite is about 10 μm for the purpose of improvement in abrasion resistance.

And, when granulate cementite is made to grow so as to have an average grain size of 3 μm or more, it is preferable that a heat-treatment in the two-phase region of austenite and cementite is applied thereto at 900° C. or more. And, it is preferable that a steel or a cast iron with an addition of carbon of 1.2 wt % or more is used.

In the heat-treatment method for rapid-cooling after rapid induction heating as described above, alloy elements such as Cr, which easily concentrates in cementite, and carbon are concentrated at vicinity of cementite which does not form a solid solution, and therefore retained austenite forms easily. In light of this fact, in the present invention, a content of the retained austenite is adjusted to 10 to 50% by volume of the parent phase thereof. As a result, internal notch action which occurs at a large amount of dispersed cementite will be defused, and conformability of a seal sliding surface, heat crack resistance and seizure resistance will be improved. The reason that the upper limit of a content of retained austenite is 50% by volume is because retained austenite of more than 50% by volume makes abrasion resistance smaller. In addition, the upper limit thereof is preferably 35% by volume.

In the ferrous floating seal part to which the aforesaid induction quenching is applied, since Cr, Mo, V W and Mn are concentrated in cementite and then the induction quenching is carried out, concentrations of such elements in a martensite parent phase of the quench hardened layer is considerably small, resulting in decreasing tempering-softening resistance of the martensite phase. This raises a problem that abrasion resistance and seizure resistance are decreased. Accordingly, in the present invention, a steel or a cast iron containing either Si of 0.5 to 3.5 wt % or Al of 0.25 to 2 wt %, or both Si and Al in a total amount of 0.5 to 3.5 wt % is induction heated and quenched to produce a ferrous floating seal, since Si and Al hardly forms a solid solution with cementite and improves tempering-softening resistance of a martensite parent phase.

Since Si and Al demonstrate remarkable tempering-softening resistance to 450° C. and work more effectively and economically than Cr even in a high-temperature range of 500 to 600° C., it is preferable that Si and Al are positively added.

In addition, Si, in reverse of Cr, significantly increases carbon activity in an austenite phase, thereby to decreases an amount of carbon which forms a solid solution with a martensite phase, in relation to an equation of 0.1×an amount of Si (wt %). And, Si moves A1 transformation temperature and A3 transformation temperature to higher. Accordingly, Si works to increase heat crack resistance of a seal sliding surface. And, in the viewpoint in which the upper limit of an amount of carbon which forms a solid solution with a martensite phase is adjusted to preferable value of 0.5 wt %, it is preferable that Si is added in a martensite phase to have a concentration of 3 wt %. Here, an addition amount (wt %) of Si is calculated by an equation of (a volume of a martensite phase (% by volume)×3)/100. And, the upper limit of an amount of Si in a martensite parent phase is 6.5 wt %. It is also preferable that Al having less effect on carbon activity of an austenite phase is positively added to increase tempering-softening resistance without decreasing an amount of carbon in a martensite parent phase.

Figure 4:
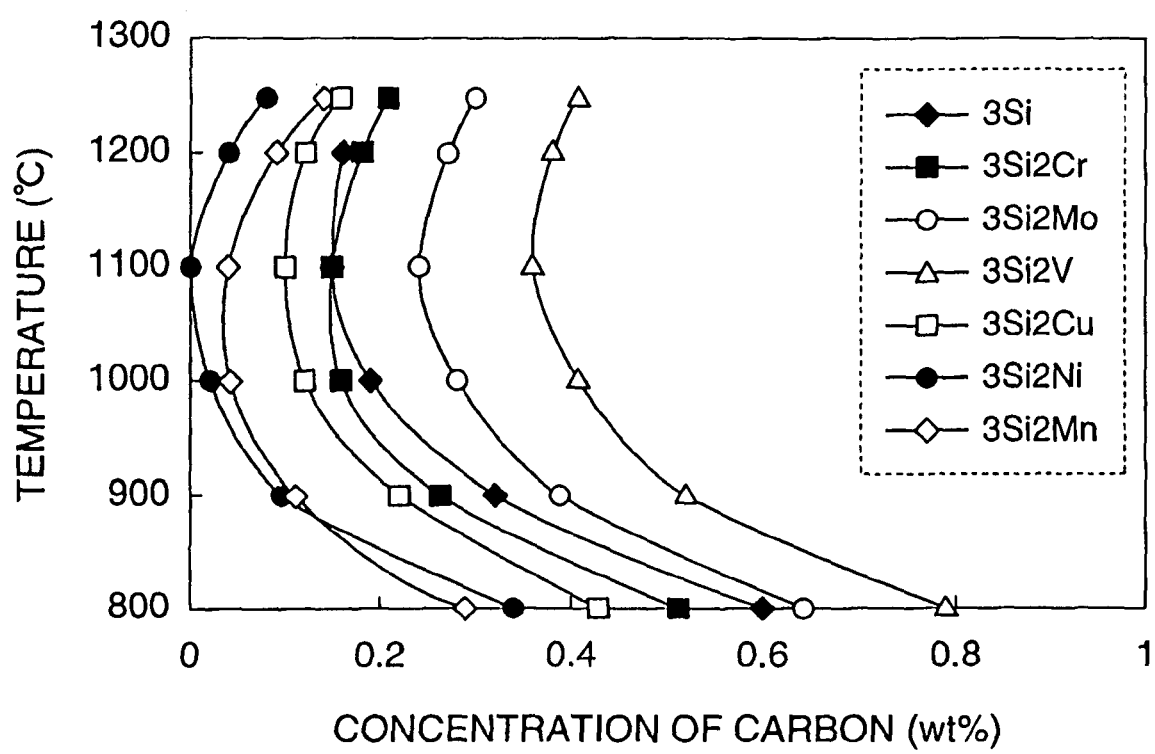
FIG. 4 is a phase diagram showing an effect of alloy element to iron and Si of 3 wt %.

In the present invention, since ferrite stabilized elements such as Si and Al are used in a large amount, it is necessary to examine a problem in which a ferrite phase remains in a quench hardened layer at induction hardening. As shown in a calculated phase diagram of iron of 3 wt % and carbon in FIG. 4, in a steel to which Si of 3 wt % is added, an addition of carbon of 0.35 wt % or more, preferably 0.55 wt % or more, causes sufficiently austenitizing at a heating temperature (850 to 1100° C.) of induction quenching. And, it is also preferable that austenite stabilized elements such as Mn, Ni and Cu in a total amount of 2 wt % or more are added. Alternatively, when Al substitute for Si is added, since Al has ferrite stabilization ability two times of Si, the upper limit of addition amount of Al is preferably set at 2 wt % in the present invention.

And, when Al coexistent with Ni is added, toughness is well improved and further age hardening is demonstrated. Accordingly, in the present invention, Ni of 1 to 6 wt % coexistent with Al of 0.25 to 2 wt % are preferably added. Accordingly, in the present invention, it is preferred that a ferrous floating seal part is produced by using a steel or a cast iron containing both of Mn and Ni in a total amount of 2 to 7 wt %. In a case in which cementite is dispersed in a martensite parent phase, Ni, Al, Si, Co and Cu are concentrated in the martensite parent phase. For example, in a case in which cementite is dispersed in 50% by volume, a concentration of Ni in the martensite phase is up to 1.5 to 9 wt %, a concentration of Si or a mixture of Si and Al in the martensite phase is up to 1 to 7 wt % and a concentration of Al in the martensite phase is up to 0.5 to 4 wt %. Accordingly, as observed in a precipitation hardening type hot work tool steel (5Ni-2Al tool steel), remarkable age hardening is expected.

And, an alloy element increasing softening-tempering resistance includes Mo and W. However, Mo and W have solid solubility with cementite as small as about 2 wt %. And, an amount of Mo which forms a solid solution with a martensite parent phase thereby to affect on tempering-softening resistance is under 0.5 wt %. Accordingly, it is preferable that the upper limit of an addition amount of Mo is set at 2 wt %. And, since W has substantially the same solid solubility with cementite as that of Mo, the upper limit of a total addition amount of Mo and W is set at 2 wt % or less.

When a steel has a structure composed of ferrite and pearlite and contains coarse ferrite before induction hardening, there will be a problem that induction heating for a short period may not causes carbon to be sufficiently dispersed in austenite. Accordingly, in the present invention, it is preferable that a seal sliding surface is made such that one or more alloy element selected from the group consisting of V, Ti, Zr, Nb, Ta and Hf in an amount of 0.05 to 5 wt % is contained therein so that at least any one of carbide, nitride and carbonitride of the alloy elements, having an average grain size of 0.1 to 5 μm, will be dispersed in a total amount of 0.1 to 10% by volume. As the result, the structure composed of ferrite and pearlite becomes finer thereby to prevent occurrence of coarse ferrite. Alternatively, it is also preferable that an amount of carbon in the steel is adjusted to 0.6 wt % or more.

Carbide, nitride and carbonitride of any one or more alloy element selected from the group consisting of V, Ti, Zr, Nb, Ta and Hf, each has less solid solubility with austenite during induction heating compared with cementite, and is very hard, whereby they are compounds excellent in seizure resistance to a steel. Accordingly, an addition thereof in a small amount contributes to fining crystal grain of austenite and to improvement in seizure resistance and abrasion resistance. Accordingly, in the present invention, in order to improve abrasion resistance by using such compounds, in view of an amount of $V_4C_3$ and WC carbide in a high-speed steel, the upper limit of an addition amount of the such compound is adjusted to 5 wt % so that the such compound will be contained in 10% by volume at the maximum. For example, in a case of TiC, by using a specific gravity of TiC of 4.9 $g/cm^3$, an addition of Ti of 5 wt % forms TiC of 6.3 wt %, which is contained in 10% by volume.

In order to efficiently improve seizure resistance and abrasion resistance of a seal sliding surface, it is preferred that at least any one of carbide, nitride and carbonitride, which are precipitated at steel solution, has a relatively large grain size. At this time, it is preferable that these compounds have an average grain size of 0.1 μm or more, as shown in size distribution of high-speed steel carbide, and more preferably 5 μm or less in view of scraping characteristic against the counterpart surface to the sliding surface.

And, in a ferrous floating seal part according to the present invention, it is possible that a seal sliding surface thereof is produced by using one of cast irons selected from the group consisting of a gray cast iron, a nodular graphite cast iron, a vermicular graphite cast iron and a pearlite malleable cast iron, in which graphite is dispersed in a parent phase having a pearlite structure containing carbon of 2 to 4.5 wt % and one or more alloy element selected from the group consisting of Cr of 0.5 to 4 wt %, V of 0.1 to 0.5 wt %, Mo of 0.3 to 2 wt % and W of 0.5 to 2 wt %. At this time, it is preferable that the cast iron contains Cu of 5 to 15 wt % so that Cu alloy phase will be dispersed in the seal sliding surface in 3 to 10% by volume. This improves conformability and lubricating property at sliding and prevents propagation of crack when heat crack occurs. Here, the lower limit (a content of 3% by volume) of a content of Cu alloy phase is set such that oil pocket effect having the same level as dispersed graphite is apparently demonstrated, and the upper limit thereof is set at 10% by volume in view of decreasing of abrasion resistance.

In a producing method for a ferrous floating seal according to the present invention, a steel product or a cast iron is rapidly heated from a preheated state at room temperature or under A1 transformation temperature to a quenching temperature of 850 to 1100° C. at a heating rate of 6° C./sec within 10 seconds by induction heating, and then rapidly cooled. Such induction heating and quenching causes at least seal sliding surface to be quench hardened.

For the aforesaid steel product and the aforesaid cast iron, as described above, the following may be applied.
(1) Steel product containing carbon of 0.5 to 1.8 wt % and further one or more alloy element selected from the group consisting of Cr of 0.3 to 3 wt %, V of 0.1 to 0.5 wt %, Mo of 0.3 to 2 wt % and W of 0.5 to 2 wt %.
(2) Cast iron selected from the group consisting of a gray cast iron, a nodular graphite cast iron, a vermicular graphite cast iron and a pearlite malleable cast iron, in which graphite is dispersed in a parent phase having a pearlite structure containing carbon of 2 to 4.5 wt % and one or more alloy element selected from the group consisting of Cr of 0.5 to 4 wt %, V of 0.1 to 0.5 wt %, Mo of 0.3 to 2 wt % and W of 0.5 to 2 wt %.
(3) White cast iron containing carbon of 2 to 4.5 wt % and further one or more alloy element selected from the group consisting of Cr of 0.5 to 4 wt %, V of 0.1 to 0.5 wt %, Mo of 0.3 to 2 wt % and W of 0.5 to 2 wt %, or cast iron in which cementite of the white cast iron is partially graphitized.
(4) The steel product (1), the cast iron (2) and the cast iron (3) each containing either any one of Si of 0.5 to 3.5 wt % or Al of 0.25 to 2 wt %, or both Si and Al in a total amount of 0.5 to 3.5 wt %.
(5) The steel product (1), the cast iron (2) and the cast iron (3) each containing Mn and Ni in a total amount of 2 to 7 wt %.
(6) The cast irons (2) and (3) each preferably containing Cu of 5 to 15 wt % so that Cu alloy phase will be dispersed in 3 to 10% by volume.

And, it is preferable that one or more alloy element selected from the group consisting of Si, Al, Mn, Ni, Cr, V, Mo, W, Cu, Co, B, Ti, Nb, Zr, P, S, Ca, Pb, Mg, Sn, Ba and Re (rare earth) is suitably added to the steel product and the cast irons of (1) to (6), in addition to the aforesaid elements, in order to ensure hardenability, tempering-softening resistance, corrosion resistance, machineability, abrasion resistance and seizure resistance and in order to regulate a structure of graphite to be dispersed in the cast iron and a formation of a pearlite structure. And, in some cases, it is not prevented that the alloy element and one or more impurity element selected from the group consisting of S, P, O and N get mixed in a steel product to produce the steel product. So, such alloy elements may get mixed as far as they have little effect on the purpose of the present invention. At this time, a total amount of such alloy element does not exceed 5 wt % and is preferably set at 2 wt % or less.

A producing method of a ferrous floating seal according to the present invention comprises a preparing step for preparing the aforesaid steel product or the aforesaid cast iron; and a quenching step for heating the steel product or the cast iron at a heating rate such that temperature rises from A1 transformation temperature to a quenching temperature in the range of 850 to 1000° C. within 10 seconds and then rapidly cooling. The quenching step results in that the steel product has a structure in which cementite in a content of 3 to 50% by volume is dispersed in a martensite parent phase which forms a solid solution with carbon of 0.15 to 0.6 wt % and that the cast iron has a structure in which cementite in a content of 3 to 50% by volume and graphite in a content of 3 to 15% by volume are dispersed in a martensite parent phase which forms a solid solution with carbon of 0.15 to 0.7 wt %.

The producing method preferably further comprises a heat treatment step for concentrating one or more alloy element selected from the group consisting of Cr, V, Mo and W in cementite in the ferrous floating seal.

And, the producing method preferably further comprises a heat treatment step for dispersing a pearlite structure region comprising platy cementite and ferrite in an area ratio of 20% or more in a steel before quenching.

As described later, SUJ2 (containing carbon of 1.01 wt % and Cr of 1.5 wt % and having hardness of Hv200), in which cementite is sufficiently spheroidized is heated to each quenching temperature at a heating rate of 6° C./sec and then rapidly cooled, and then hardness of a quench hardened layer, a residual amount of cementite and an amount of carbon which forms a solid solution with a martensite phase of the quench hardened layer are measured. As a result, it is found that an organization in which cementite is dispersed in the low-carbon martensite phase in a high-density of 5% or more by volume is formed, achieving the purpose of the present invention. At this time, it is also found that a suitable heating temperature is 900 to 1000° C. When a concentration of Cr decreases lower than that of SUJ2, a concentration of Cr in cementite will decrease and the lower limit of suitable heating temperature will decrease to about 850° C. On the contrary, when a concentration of Cr increases higher than SUJ2, the upper limit thereof will increase to about 1100° C. And, when considering a heating rate of 6° C./sec, it is expected that a heating method using a salt-bath is suitably applied. However, from the viewpoint of productively, environment of quenching work and economical efficiency, an induction heating method is suitably applied. At this time, a heating period is preferably within 10 second which is obtained by an induction heating rate.

And, a seal sliding surface of a ferrous floating seal part is pre-heated within 300° C. to A1 transformation temperature, and rapidly heated to a quenching temperature of 850 to 1100° C. (preferably 900 to 1100° C.) at a heating rate of 150° C./sec or more (within 3 seconds) by induction heating using a high frequency of 60 kHz and below, and then rapidly cooled. Such quenching treatment makes at least seal sliding surface of the ferrous floating part quench hardened. This enables producing a ferrous floating seal part, in which pearlite cementite is dispersed in a martensite phase to provide higher hardness and little strain.

Referring now to the drawings, there will be explained floating seal parts and producing method thereof according to preferred embodiment of the invention.

Example 1

In this example, in order to prove that a floating seal part in which cementite is densely dispersed in a parent phase comprising low carbon martensite has remarkably improves sliding property, by using steel products which has various compositions as shown in Table 1, a structure of each of the steel products quenched by induction hardening under various conditions is examined. "Volume of cementite (% by volume)" and "volume of γ phase (% by volume)" each shown in Table 1 are obtained by observing a photograph of each structure, and "PV value" in Table 1 will be described later.

TABLE 1

COMPOSITION (wt %) AND PROPERTY OF TEST STEELS
kg/cm × m/

| No. | C | Si | Aj | Mn | Ni | Cr | Mo | W | Co | CONTENT OF CEMENTITE (% BY VOLUME) | CONTENT OF RETAINED γ PHASE (% BY VOLUME) | PV VALUE |
|---|---|---|---|---|---|---|---|---|---|---|---|---|
| No. 1 | 0.98 | 0.27 | 0.024 | 0.48 | | 1.47 | | | | 7 (GRAIN) | 29 | 1.6 |
| No. 2 | 0.53 | 0.21 | | 0.83 | | 1.01 | 0.16 | | | 2.6 (GRAIN) | 17 | 1.2 |
| No. 3 | 0.84 | 1.12 | 0.019 | 0.4 | | 0.91 | | | | 5.8 (PEARLITE) | 33 | 2 |
| No. 4 | 0.98 | 0.55 | 0.023 | 1.11 | | 1.08 | | | | 5.8 (GRAIN) | 35 | 1.3 |
| No. 4 | | | | | | | | | | 6.2 (GRAIN + PEARLITE) | 28 | 1.9 |
| No. 5 | 1.25 | 0.81 | 0.031 | 1.06 | | 1.42 | | | | 12 (GRAIN + PEARLITE) | 36 | 2.2 |
| No. 6 | 1.62 | 0.21 | 1.12 | 1.45 | | 2.21 | | | | 18 (GRAIN + PEARLITE) | 38 | 2.7 |
| No. 7 | 1.61 | 2.45 | 0.029 | 1.5 | | 1.02 | | | | 20 (GRAIN + PEARLITE) | 32 | 3.1 |
| No. 8 | 3.41 | 2.49 | | 0.47 | 4.82 | 2.06 | | | | 19 (EUTECTIC θ + GRAPHITE) | 26 | 3.9 |
| No. 9 | 3.45 | 1.51 | 1.51 | 0.52 | 4.5 | 1.61 | | | | 21 (EUTECTIC θ + GRAPHITE) | 23 | 4.5 |
| No. 10 | 3.62 | 1.78 | 0.01 | 0.48 | 0.02 | 0.06 | | | | 3 (GRAPHITE FLAKE + PEARLITE) | 11 | 3.2 |
| COMPARATIVE STEEL 1 | 0.98 | 0.27 | 0.024 | 0.48 | | 1.47 | | | | 3 (GLANULAR θ) | 12 | 0.6 |
| COMPARATIVE STEEL 2 | 3.6 | 1.1 | | 0.59 | | 15.2 | 2.3 | | | $Cr_7C_3$: 35% BY VOLUME | — | 1.8 |
| COMPARATIVE STEEL 3 | 3.2 | 1.2 | | 0.51 | | 9.2 | 6.1 | 4.9 | 5 | $M_6C, Cr_7C_3$: 35% BY LOLUME | — | 2.5 |
| COMPARATIVE STEEL 4 | 3.41 | 2.49 | | 0.47 | 4.82 | 2.06 | | | | 42 (EUTECTIC θ) | 16 | 2.3 |

Figure 5A:
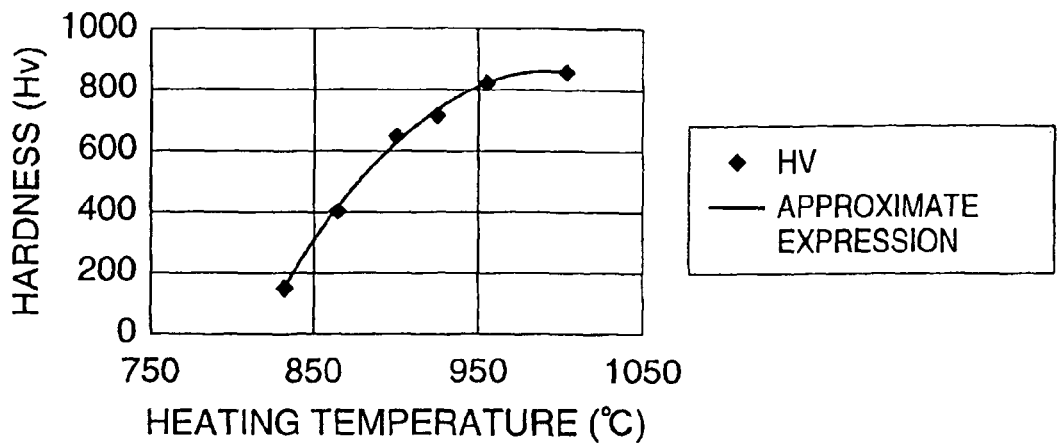
FIG. 5(a) is a graph showing a relation between induction heating temperature and quenching hardness.
Figure 5B:
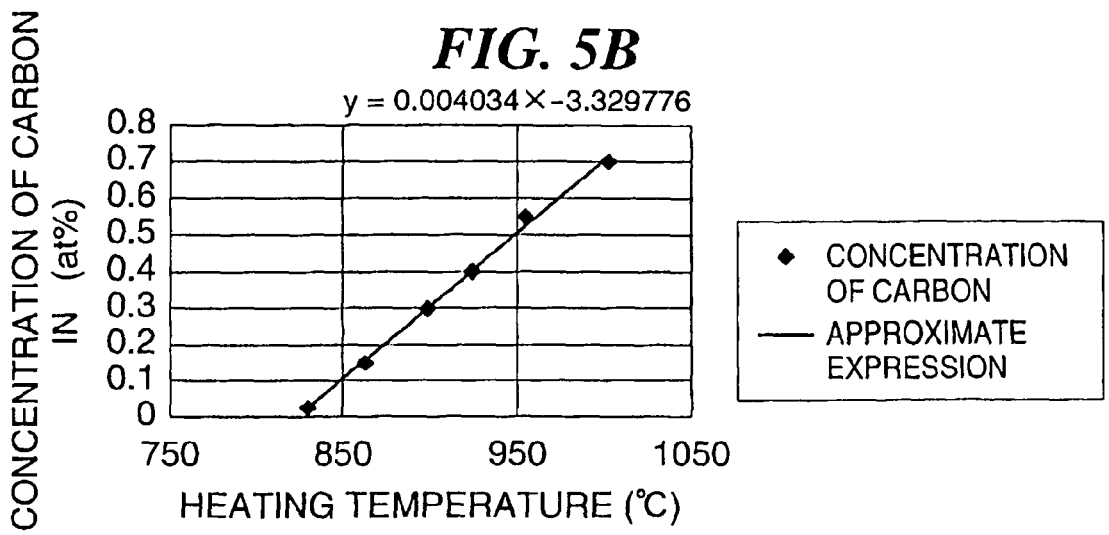
FIG. 5(b) is a graph showing a relation between induction heating temperature and carbon concentration of martensite.
Figure 5C:
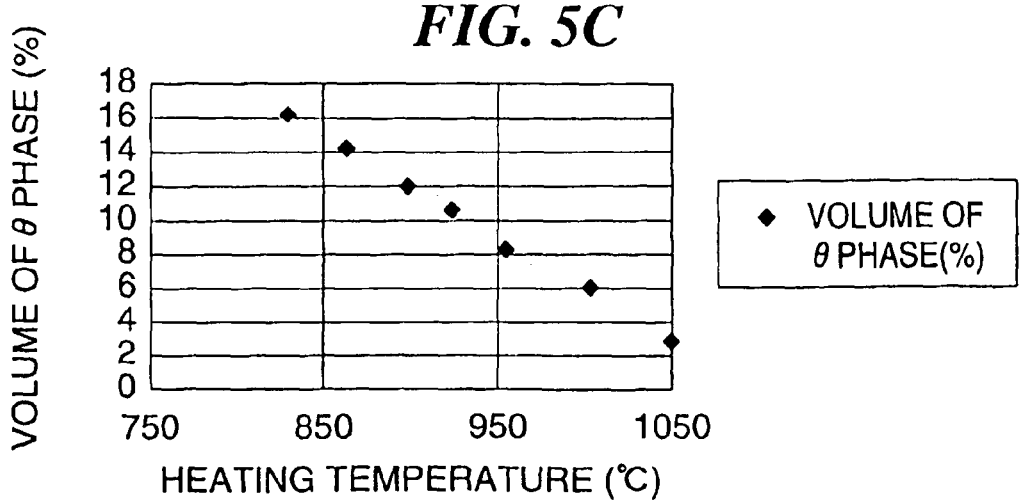
FIG. 5(c) is a graph showing a relation between induction heating temperature and volume (% by volume) of θ phase.

No. 1 steel (correspondent to SUJ2) in Table 1, to which a cementite granulating treatment (slow cooling) for heating at 810° C. for 2 hours and then slowly cooling to 600° C. was applied, was heated to various temperatures in the range of 800 to 1000° C. at a heating rate of 6° C./sec by induction heating and then water quenched. Then, hardness of the quenched layer of the steel was measured. FIG. 5(a), (b) and (c) are graphs showing a relation between a concentration of carbon in martensite and an amount of cementite which does not form a solid solution, based on the hardness of the quenched layer. From the graphs, it was found that concentrating of Cr (an amount of Cr of about 9 wt %) in cementite caused a delay in a solid solution formation of cementite with austenite during heating. And, in order to obtain martensite having sufficient hardness enough for a ferrous floating seal, it was necessary to set a heating temperature at least 900° C. or more, at which a concentration of carbon in martensite was about 0.3 wt % and hard cementite particles were dispersed in 12% by volume. Accordingly, it was found that sufficient seizure resistance, heat crack resistance and abrasion resistance required for a ferrous floating seal were achieved.

And, in a case of in which a heating temperature was set at 1000° C., a very hard quench hardened layer in which cementite in a content of about 6% by volume was dispersed in a martensite parent phase containing carbon of 0.7 wt % was obtained. However, since a retained austenite phase increases thereby to saturate hardness of the quenched layer, it was necessary for a ferrous floating seal that at least one condition among the later conditions was satisfied, in which an induction quenching temperature was under 1000° C. from the viewpoint of heat crack resistance, an amount of carbon in martensite was under 0.7 wt % and cementite was dispersed in 3% or more by volume.

No. 4 test steel of Table 1 to which the aforesaid granulating treatment (slow cooling) was applied and another No. 4 test steel which was maintained at 820° C. for 1.5 hours and then cooled to disperse pearlite cementite and granulated cementite were prepared. Both of No. 4 test steels were heated to various temperatures in the range of 900 to 1100° C. at a heating rate of 1000° C./sec faster than a conventional heating rate, and then quenched. Then, quenched sliding surfaces of the both steels were studied.

Figure 6:
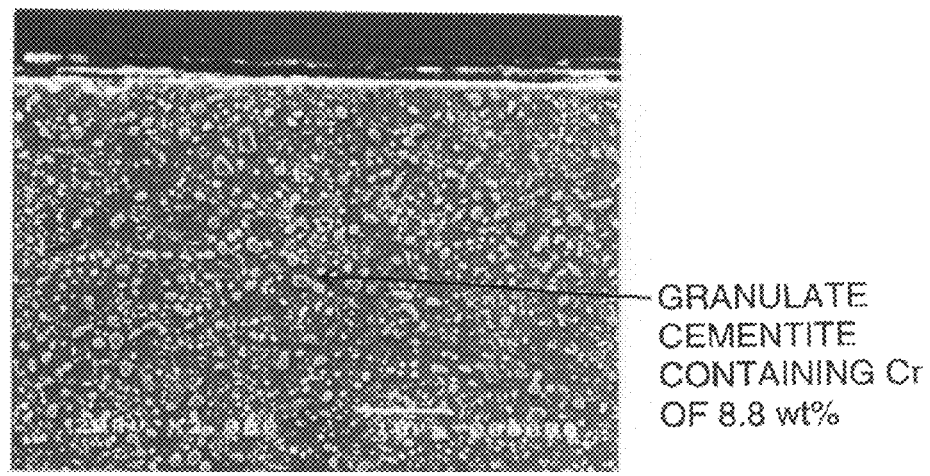
FIG. 6 is a photograph showing a structure of No. 4 steel to which rapidly induction quenching is applied.
Figure 7A:
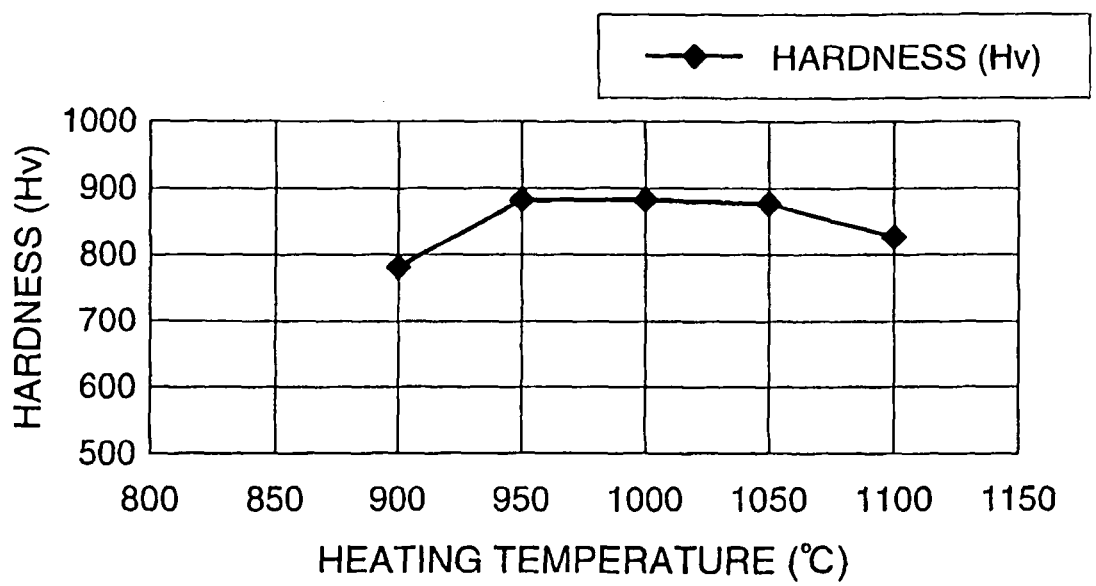
FIG. 7 is a graph showing a relation between heating temperature and, quenching hardness and an amount of retained γ.
Figure 7B:
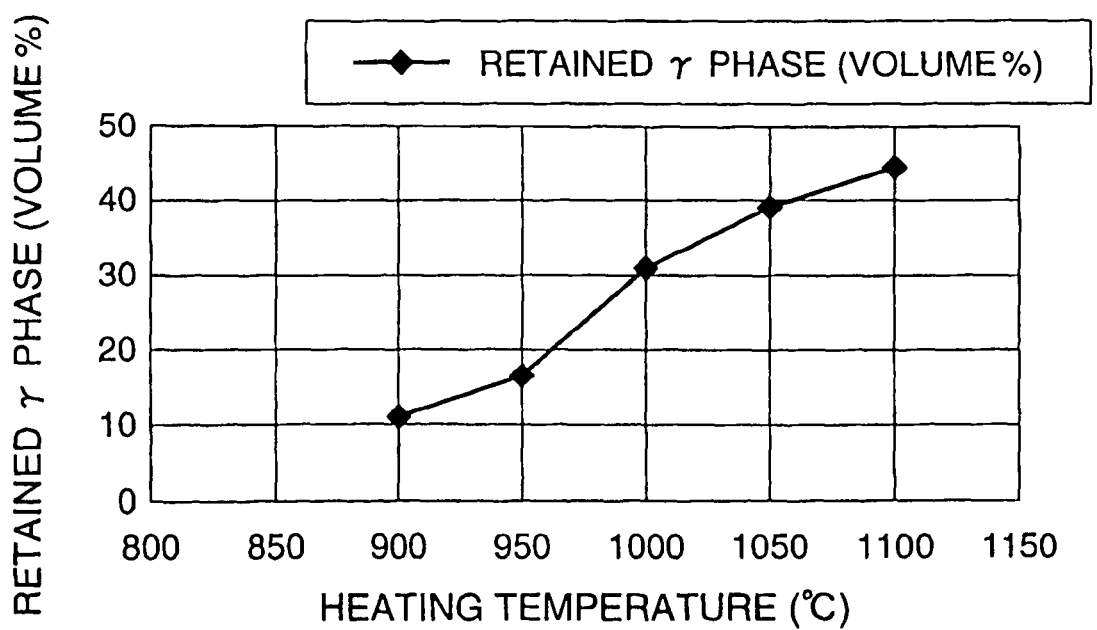

As a result, as shown in FIG. 6, in the No. 4 test steel which the granulating treatment (slow cooling) was applied to and then quenched from a heating temperature of 1000° C., granulated cementite was dispersed in a large amount. And, as shown in FIG. 7, the quenched layer thereof was hardened to have hardness of Hv830 at a maximum in spite of containing retained austenite in 30 to 45% by volume. And, if retained austenite would be contained in as large as 50% by volume, abrasion resistance thereof could not be damaged.

Figure 8:
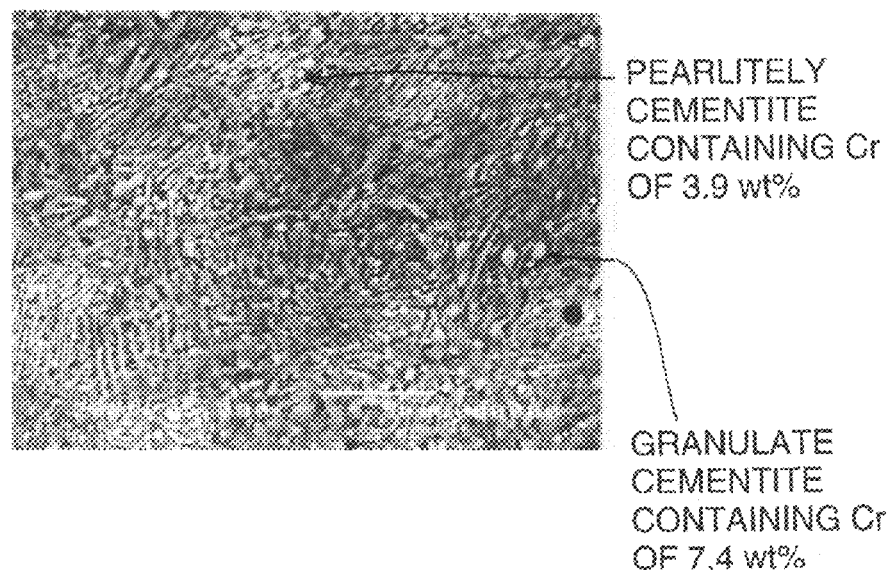
FIG. 8 is a photograph showing a structure of No. 4 steel in which pearlite cementite and granulated cementite are dispersed, to which rapidly induction quenching is applied.

On the other hand, FIG. 8 shows a structure of a seal sliding surface of the No. 4 test steel in which after dispersing pearlitely cementite and granulated cementite, was heated to 1000° C. and then quenched. From the figure, platy cementite having a pearlite structure was dispersed in a martensite parent phase. And, the test steel had hardness of Hv940 higher than the hardness (Hv880) of the test steel of FIG. 6.

By using No. 4 steel containing a structure before pearlite transformation, a relation between a heating rate and a heating temperature when pearlite cementite was dispersed was studied. As a result, even in a case of a heating rate of 150° C./sec and a hearting temperature of 900° C., pearlitely cementite was dispersed and the quenched layer was hardened to have hardness of Hv945. In order to disperse pearlitely cementite stably, a heating rate of 100° C./sec or more, more preferably 150° C./sec or more, was required when the lower limit of heating temperature was 850° C.

In FIG. 6 and FIG. 8, a concentration of Cr in cementite, which were analyzed by using an energy dispersive X-ray analyzer (EDAX) in an erector microscope, was shown. It was observed that a concentration of Cr in pearlitely cementite was remarkably dense but not as much as in granulated cementite, whereby pearlitely cementite easily formed a solid solution. Accordingly, applying a heat treatment in which Cr was concentrated in pearlitely cementite before quenching allowed more stably dispersion of pearlitely cementite.

A concentration of carbon in martensite of No. 1 steel to which rapidly heating and quenching was applied was 0.5 wt %, which was obtained by using a lattice parameter of the martensite phase of the steel. As compared the result with the result (0.7 wt %) of No. 1 steel, rapidly induction heating decreased a concentration of carbon which formed a solid solution and increased an dispersion amount of cementite. This was preferable in the viewpoint of improvement in heat crack of a ferrous floating seal.

These results of the SUJ2 to which the aforesaid induction hardening was applied were applicable to a white cast iron, a gray cast iron, a nodular graphite cast iron, a vermicular graphite cast iron, a pearlite malleable cast iron, each of which a parent phase was a pearlite structure, and a cast iron in which white cast iron was graphitized to disperse graphite and cementite finely.

Example 2

Figure 9:
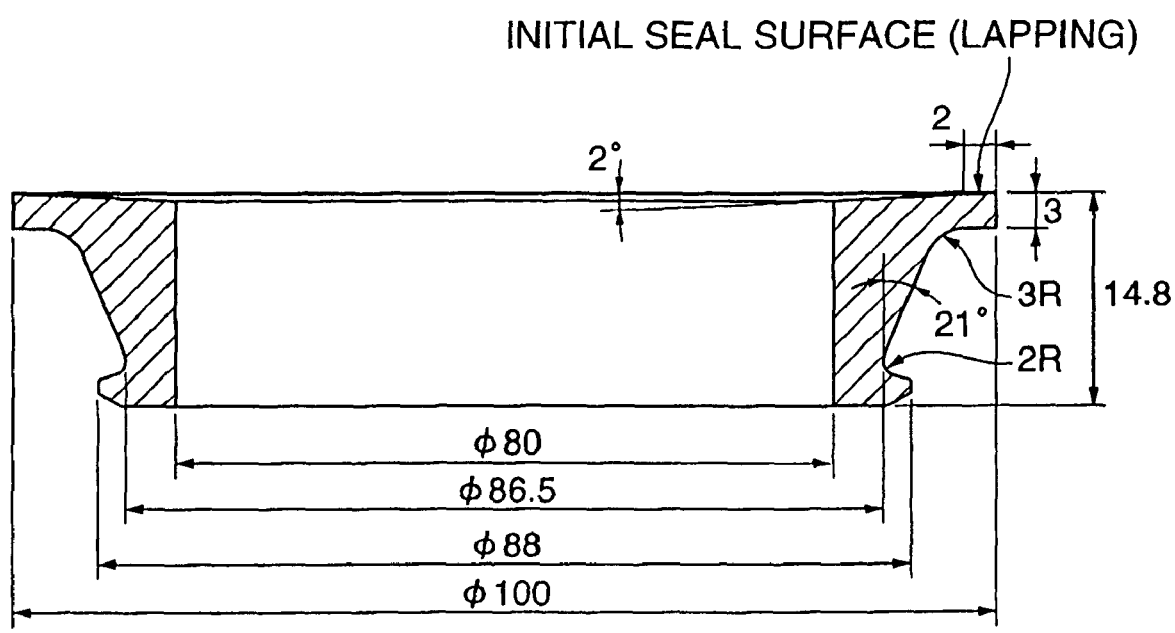
FIG. 9 is a cross section drawing showing a ferrous floating seal.
Figure 10:
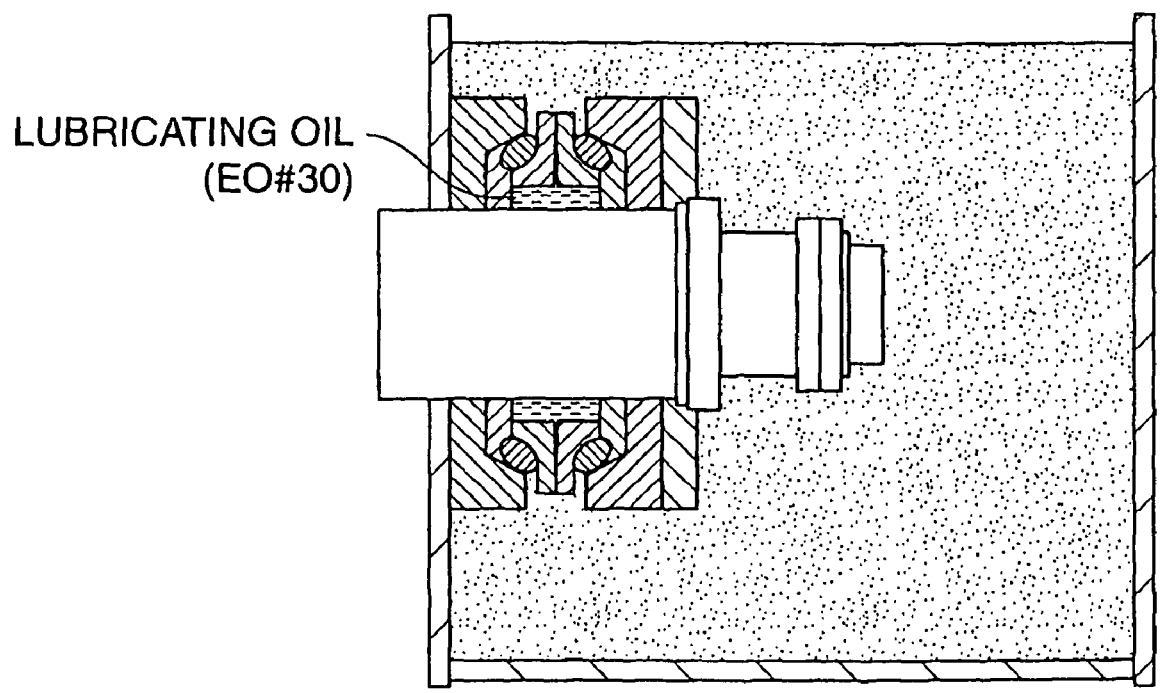
FIG. 10 is a schematic drawing showing a floating seal tester.

In this example, each of the test steels of Table 1 was machined to have a shape of a floating seal, as shown in FIG. 9, and each sliding surface of the test steels was heated to a quenching temperature of 950° C. at a heating rate of 1000° C./sec by the aforesaid induction hardening, and after tempering at 160° C. for one hour, a lapping treatment was applied to prepare floating seal specimens. And, for each of the floating seal specimens, heat crack resistance and seizure resistance was measured by using a sliding test apparatus (a floating seal tester) of FIG. 10 in air.

The floating tester used a floating seal member, in which each of the prepared floating seal specimens was used as a pair of seal rings with the seal surface contacted each other. An O-ring which pressed one of the seal rings was rotated around an axis of the floating seal member with respect to a fixed O-ring which pressed another seal ring with applying load to the O-ring to be rotated. Here, the seizure resistance was evaluated by using a PV value (kgf/cm:m/sec), which was obtained by product of P (pressure) and V (revolution rate) when sliding resistance (sliding surface temperature) rapidly increased while changing a rotating rate (a revolution rate V) under a condition in which press load between the seal surfaces was kept at 63 kg/cm (pressure P was 2 kg/cm, the pressure was load per seal surface length) to enclose engine oil (EO#30). And, as comparative specimens, were prepared a comparative specimen 1: SUJ2 quenched at 840° C., a comparative specimen 2: high-carbon and high-Cr cast iron, a comparative specimen 3: high-carbon and high-Cr and Mo cast iron, and a comparative specimen 4: martensite cast iron of Ni-Hard cast iron, the comparative specimens 2, 3 and 4 being conventionally used for a floating seal part.

Table 1 showed an amount (% by volume) of cementite in a quenched structure, an amount (% by volume) of retained austenite and a PV value of each of the test specimens. As compared the test steels No. 1 to No. 7 with the comparative specimen 1, it was understood that dispersing cementite in a low-carbon martensite parent phase increased a PV value, and further dispersing pearlite cementite increased a PV value as so much as improving in tempering-softening resistance by Si and Al. And, as compared with comparative specimens 2, 3 and 4, it was understood that the test steels No. 1 to No. 7 were superior from an economical viewpoint.

And, as compared the test steels No. 8 to No. 10 made of high-carbon cast irons with the comparative specimen No. 4, it was found that dispersing graphite improved seizure resistance sufficiently and caused cementite to be dispersed in a high density. Accordingly, the test steels No. 8 to No. 10 were suitable for a ferrous floating part excellent in abrasion resistance (here, the test steels No. 8 and No. 9 were made such that a white cast iron were graphitized at 950° C. for one hour and cooled to transform a parent phase to a pearlite structure, and then induction heated and quenched).

Since a ferrous floating seal, as shown in FIG. 9, often had a sealing portion of a thickness of about 2 to 5 mm, large deformation easily occurred when the hardened layer was too deeply quenched by induction hardening. However, the rapidly induction hardening according to the example 2 allowed a surface layer to be quenched shallowly in a moment, and therefore was suitable for preventing such deformation. Especially, rapidly induction hardening after pre-heating at under A1 transformation temperature was preferred.

However, in the case of application of the rapidly induction hardening for a large size floating seal part, since cost of equipment became expensive, it was also possible that a steel in which Cr was concentrated to have a concentration of 5 wt % or more was heated by using a salt bath of 1000° C. in view of FIG. 3.

The present invention is not limited to any of the above-described constructions and embodiments, and various modifications of the present invention can be made without departing from the technical ideas.

What is claimed is:

1. A ferrous seal sliding part having a seal sliding surface, wherein said seal sliding surface has a quench hardened layer having a structure in which a martensite parent phase forms a solid solution with carbon of 0.15 to 0.6 wt % and contains cementite dispersed therein in a content of 3 to 50% by volume,
wherein said martensite parent phase has a layered structure region comprising platy cementite and martensite phase dispersed therein in an area ratio of 20% or more, whereby cementite including said platy cementite is dispersed in the martensite parent phase in a total content of 3 to 50% by volume,
wherein said platy cementite shows an oil pocket effect for receiving a lubricating oil on said sliding surface, and
wherein cementite dispersed in said martensite parent phase contains granulated cementite having an average grain size of 0.1 to 10 μm dispersed in a total content of 0.1 to 10% by volume in addition to said platy cementite.

2. A ferrous seal sliding part according to claim 1,
wherein said seal sliding surface is formed by a steel product containing carbon of 0.5 to 1.8 wt % and Cr of 0.5 to 3 wt %,
wherein an average concentration of Cr in said cementite is 2.5 to 15 wt %.

3. A ferrous seal sliding part according to claim 2,
wherein said steel product contains one or more alloy elements selected from the group consisting of V of 0.1 to 0.5 wt %, Mo of 0.3 to 2 wt % and W of 0.5 to 2 wt %.

4. A ferrous seal sliding part according to claim 1,
wherein said seal sliding surface contains retained austenite in a content of 10 to 50% by volume.

5. A ferrous seal sliding part according to claim 4,
wherein said seal sliding surface is formed by a steel product or a cast iron containing either any one of Si of 0.5 to 3.5 wt % or Al of 0.25 to 2 wt %, or both Si and Al in a total amount of 0.5 to 3.5 wt %.

6. A ferrous seal sliding part according to claim 1,
wherein said seal sliding surface is formed by a steel product or a cast iron containing both Mn and Ni in a total amount of 2 to 7 wt %.

7. A ferrous seal sliding part according to claim 1,
wherein said seal sliding surface contains one or more alloy elements selected from the group consisting of V, Ti, Zr, Nb, Ta and Hf in a total amount of 0.05 to 5 wt %, whereby at least any one of carbide, nitride and carbonitride of said alloy elements, having an average grain size of 0.1 to 5 μm, is dispersed in a total content of 0.1 to 10% by volume.

* * * * *